(12) United States Patent
Oike et al.

(10) Patent No.: US 7,775,129 B2
(45) Date of Patent: Aug. 17, 2010

(54) ROTATION ANGLE SENSOR

(75) Inventors: Kouji Oike, Kyoto (JP); Kiyotaka Uehira, Osaka (JP); Kiyotaka Sasanouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 12/282,226

(22) PCT Filed: Apr. 9, 2007

(86) PCT No.: PCT/JP2007/057805

§ 371 (c)(1),
(2), (4) Date: Sep. 9, 2008

(87) PCT Pub. No.: WO2007/119701

PCT Pub. Date: Oct. 25, 2007

(65) Prior Publication Data
US 2009/0058405 A1    Mar. 5, 2009

(30) Foreign Application Priority Data
Apr. 10, 2006   (JP) ............... 2006-107352
Apr. 10, 2006   (JP) ............... 2006-107353

(51) Int. Cl.
*G01L 5/04* (2006.01)
(52) U.S. Cl. ............... 73/862.46; 73/862.326
(58) Field of Classification Search ......... 73/862–326, 73/862.46, 862.326
See application file for complete search history.

(56) References Cited

U.S. PATENT DOCUMENTS

| 5,930,905 | A | 8/1999 | Zabler et al. | |
|---|---|---|---|---|
| 6,938,721 | B2 * | 9/2005 | Ono et al. | 180/402 |
| 7,201,070 | B2 * | 4/2007 | Tokumoto | 73/862.328 |
| 7,410,028 | B2 * | 8/2008 | Chikaraishi | 180/402 |
| 2003/0014168 | A1 * | 1/2003 | Williams | 701/41 |
| 2005/0178608 | A1 * | 8/2005 | Shiino et al. | 180/444 |
| 2006/0081409 | A1 * | 4/2006 | Chikaraishi | 180/402 |
| 2007/0284180 | A1 * | 12/2007 | Suehiro et al. | 180/444 |
| 2009/0211374 | A1 * | 8/2009 | Oike et al. | 73/862.08 |
| 2009/0320613 | A1 * | 12/2009 | Uehira et al. | 73/862.333 |

FOREIGN PATENT DOCUMENTS

| JP | 11-500828 | 1/1999 |
|---|---|---|
| JP | 11-194007 | 7/1999 |
| JP | 2001-91375 | 4/2001 |
| JP | 2002-340515 | 11/2002 |
| JP | 2005-201712 | 7/2005 |

OTHER PUBLICATIONS

International Search Report issued Jul. 10, 2007 in the International (PCT) Application No. PCT/JP2007/057805.

* cited by examiner

*Primary Examiner*—Max Noori
(74) *Attorney, Agent, or Firm*—Wenderoth, Lind & Ponack, L.L.P.

(57) ABSTRACT

A rotation angle sensor is provided with a shaft portion having a torsion bar, a rotation angle sensing portion for detecting rotation angle of the shaft portion, and a torque sensing portion for detecting angle of torsion of the torsion bar. The rotation angle sensing portion and the torque sensing portion improve their own detecting accuracies by using each other's detecting result, whereby the rotation angle sensor can detect rotation angle and angle of torsion of a multi-turn rotatable body with high accuracy and high resolution.

6 Claims, 13 Drawing Sheets

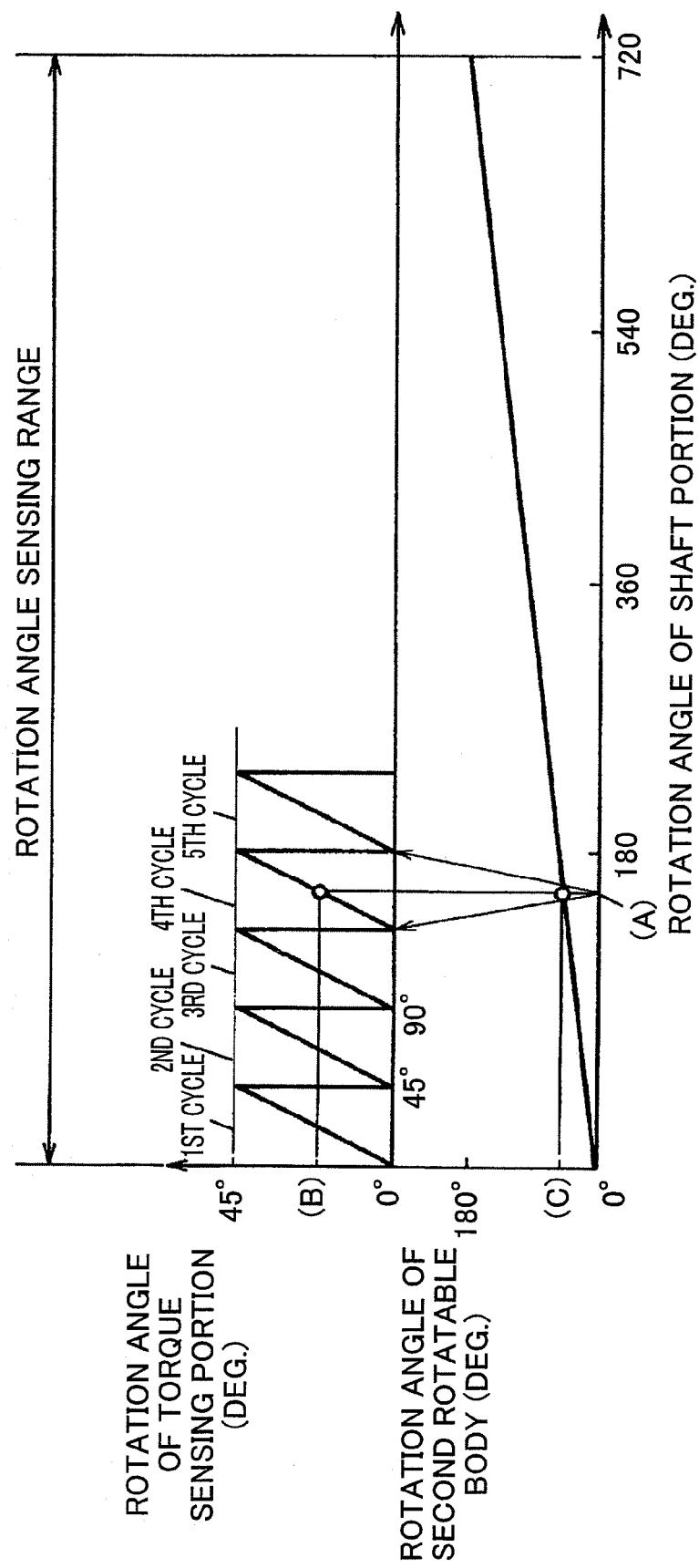

ROTATION ANGLE SENSOR

TECHNICAL FIELD

The present invention relates to a rotation angle sensor used in a vehicle body control system of a vehicle, for instance, and in particular to a rotation angle sensor for a multi-turn steering wheel of a power steering system of a vehicle, for instance.

BACKGROUND ART

Cited below are examples of rotation angle sensors used in a vehicle body control system of a vehicle or the like.

There exist a method and a device for measuring the angle of a rotatable body as disclosed in Patent Document 1, for instance. This is an example of a sensor for detecting rotation angle of a rotatable body, such as an automotive steering wheel, which rotates within a limited but over single-turn range. The device shown in FIG. 12 disclosed in Patent Document 1 detects the rotation angle from angles of rotation of two rotatable bodies 50 and 51 having a phase difference.

Also, as an example, a below-described rotation angle sensor is disclosed in Patent Document 2. Referring to FIG. 13, the rotation angle sensor disclosed in Patent Document 2 is such that two gear portions 259 are attached to a rotary shaft (not shown) of which rotation angle is to be detected via a hooking spring 260. These two gear portions 259 are engaged with gear portions 262 which hold code disks 261 having outer peripheral surfaces on which different magnetic poles are alternately arranged. As the magnetic poles provided on the code disks 261 move in rotary motion as a result of rotation of the rotary shaft of which rotation angle is to be detected, it is possible to detect the rotation angle of the rotary shaft by counting displacements of the magnetic poles by means of magnetism sensing devices 263 which are disposed face to face with the outer peripheral surfaces of the code disks 261.

With this rotation angle sensor attached to two shafts which are interconnected by a torsion bar, for example, it is possible to detect torque by comparing rotation angles of the rotary shafts when the torque acts between the two shafts and torsion occurs between the shafts.

A manufacturing process of the rotation angle sensor of FIG. 13 includes a magnet forming step for magnetizing the magnetic poles of the code disks 261 and a mounting step for mounting the gear portions 262 in such a way that the gear portions 262 mesh with the gear portions 259. Generally, the magnetic poles of the code disks 261 are formed by setting the gear portions 262 to which the unmagnetized code disks 261 have been attached in a magnetizer and magnetizing the code disks 261 so that the different magnetic poles are alternately formed along a circumferential direction of each code disk 261 at specific intervals. The two gear portions 262 are attached to the rotary shaft in such a way that the gear portions 262 face each other.

Also, while a structure for torque detection is generally used in an electric power steering system, known types of electric power steering system include rack-assist type, pinion-assist type and column-assist type which are selected according to properties and specifications of the respective types. The rack-assist type and the pinion-assist type are disposed at a steering gearbox at an axle side whereas the column-assist type is disposed at a steering column. Structures for detecting rotation angle disclosed in Patent Documents 1 and 2 are disposed at a steering column on a steering wheel side in most cases.

The structure disclosed in Patent Document 1, however, used to have a problem in that there has been a possibility that a large measurement error could occur if rotation angles detected by the two rotatable bodies 50, 51 deviate due to gear looseness, for instance.

In the structure disclosed in Patent Document 2, a rotation angle sensing portion for detecting the rotation angle and a torque sensing portion for detecting the torque are combined to form a single unit. Therefore, it is impossible to use the structure disclosed in Patent Document 2 if it is intended to dispose the rotation angle sensing portion at the steering column and the torque sensing portion at the steering gearbox, for instance.

Patent Document 1: Japanese Unexamined Patent Publication No. 1999-500828
Patent Document 2: Japanese Unexamined Patent Publication No. 1999-194007

DISCLOSURE OF THE INVENTION

It is an object of the present invention to provide a rotation angle sensor which can detect rotation angle and torque of a rotary shaft, such as a steering shaft, with high accuracy and high resolution without errors.

A rotation angle sensor according to one aspect of the present invention comprises a shaft portion having a torsion bar, a rotation angle sensing portion for detecting rotation angle of the shaft portion, and a torque sensing portion for detecting angle of torsion of the torsion bar, wherein the rotation angle sensing portion and the torque sensing portion improve their own detecting accuracies by using each other's detecting result.

In the aforementioned rotation angle sensor, the rotation angle sensor uses the detecting result of the torque sensing portion when detecting the rotation angle of the shaft portion. On the other hand, the torque sensing portion uses the detecting result of the rotation angle sensing portion when detecting the torque acting on the shaft portion. Accordingly, it is possible to detect the rotation angle and torque of the shaft portion with higher accuracy and higher resolution as compared to a conventional arrangement in which the rotation angle and torque are separately detected.

BRIEF DESCRIPTION OF THE DRAWINGS

FIG. 5 is a diagram showing detected waveforms representative of absolute rotation angle of a shaft portion detected by the rotation angle sensor of FIG. 1;

BEST MODES FOR CARRYING OUT THE INVENTION

Figure 1:
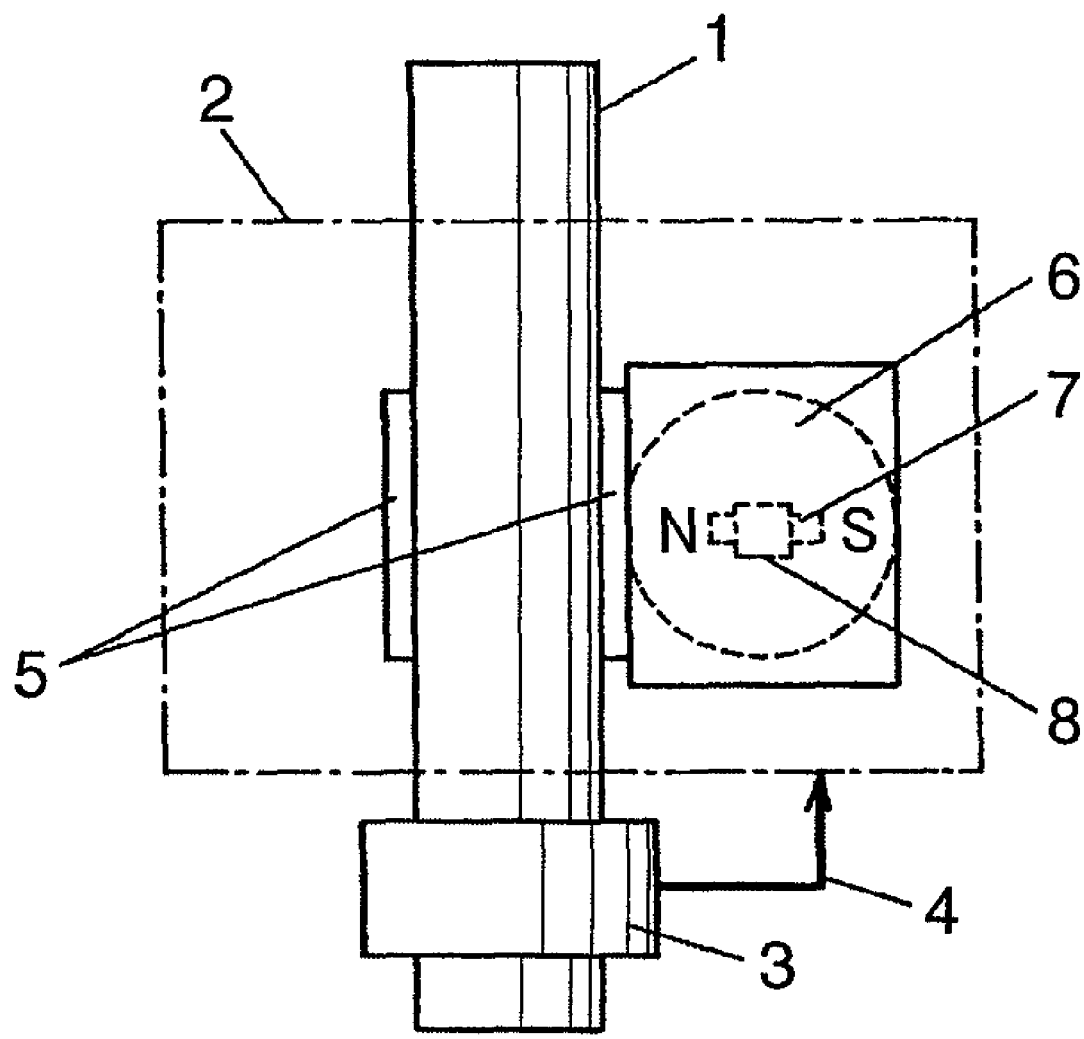
FIG. 1 is a diagram showing the basic configuration of a rotation angle sensor according to a first embodiment of the present invention.

Embodiments of the present invention are described hereinbelow with reference to the accompanying drawings, wherein the same or similar elements are designated by the same or similar reference numerals and a description of those elements may not be provided.

First Embodiment

Figure 2:
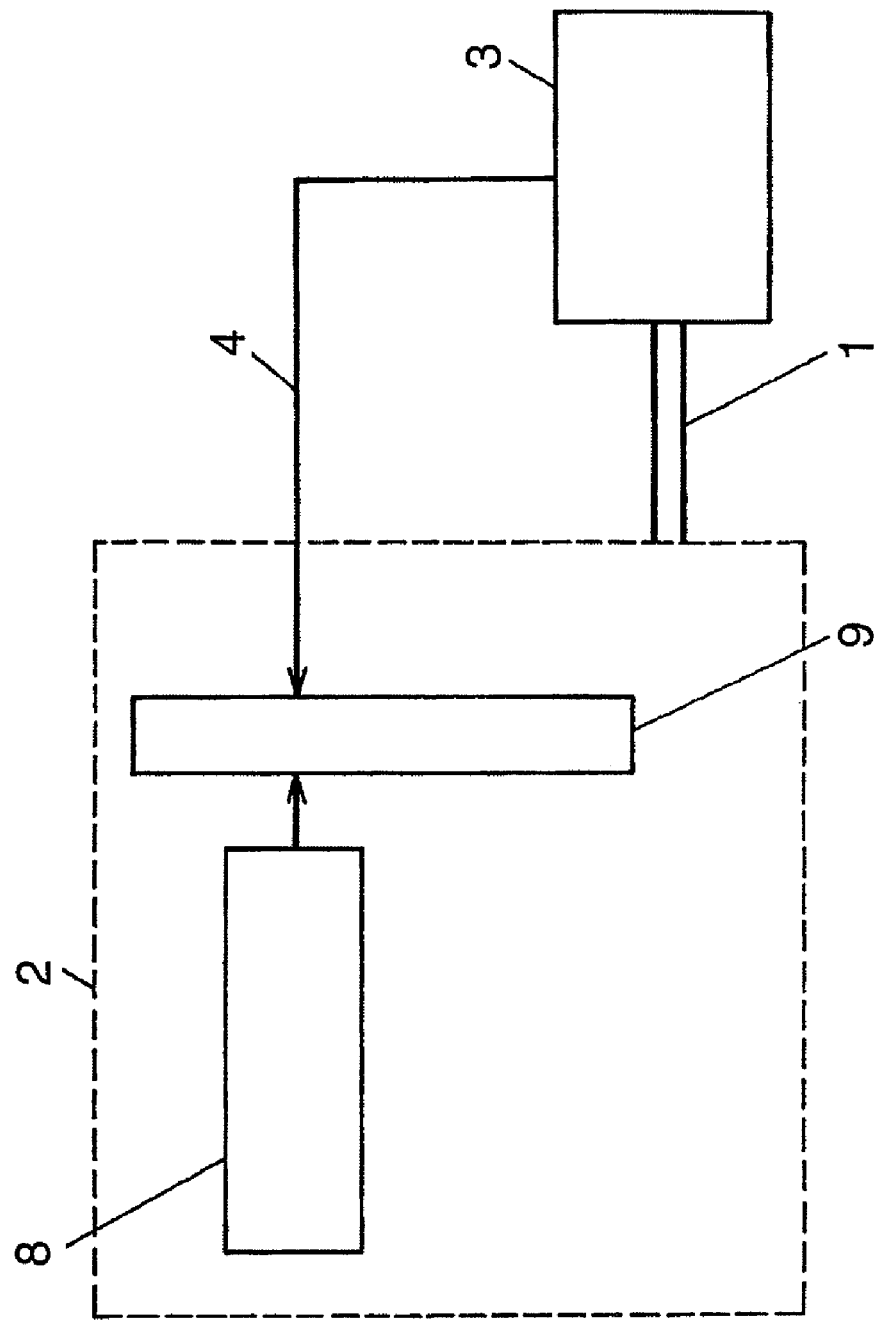
FIG. 2 is a block diagram showing the circuit configuration of the rotation angle sensor of FIG. 1.
Figure 3:
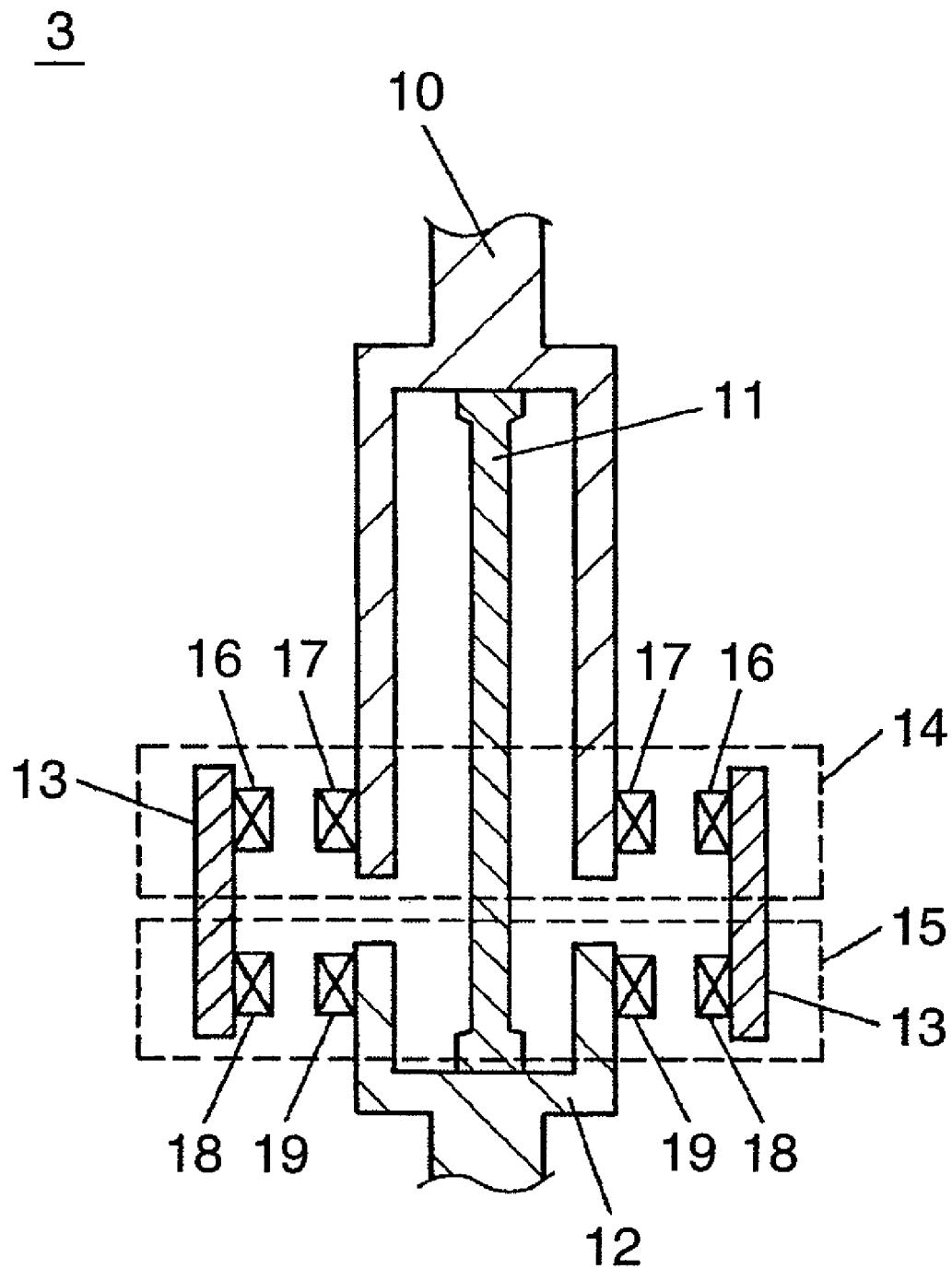
FIG. 3 is a diagram showing the basic configuration of a torque sensing portion 3 of FIGS. 1 and 2.

FIG. 1 is a diagram showing the basic configuration of a rotation angle sensor according to a first embodiment of the present invention, FIG. 2 is a block diagram showing the circuit configuration of the rotation angle sensor of FIG. 1, FIG. 3 is a diagram showing the basic configuration of a torque sensing portion 3 of FIGS. 1 and 2, FIGS. 4A and 4B are diagrams showing an operating principle of the torque sensing portion 3 of FIGS. 1 and 2, and FIG. 5 is a diagram showing detected waveforms representative of absolute rotation angle of a shaft portion detected by the rotation angle sensor of FIG. 1.

Referring to FIG. 1, the rotation angle sensor according to the first embodiment of the present invention comprises a rotation angle sensing portion 2 for detecting rotation angle of the shaft portion 1, such as a steering shaft, the torque sensing portion 3 and a serial communication line 4. The rotation angle sensing portion 2 includes a first rotatable body 5 having a worm portion, a second rotatable body 6 having a wheel portion which is joined to the worm portion of the first rotatable body 5, a magnet 7 disposed at a central part of the second rotatable body 6 and a first sensing part 8 for detecting the rotation angle of the shaft portion 1. The worm portion of the first rotatable body 5 is meshed with the wheel portion of the second rotatable body 6, so that when the first rotatable body 5 rotates, the second rotatable body 6 rotates at a speed ratio determined by the ratio of the numbers of teeth of the worm portion and the wheel portion.

In the rotation angle sensor of the present embodiment, the rotation angle sensing portion 2 is disposed at a steering column on a steering wheel side whereas the torque sensing portion 3 is disposed at a steering gearbox on an axle side with respect to the shaft portion 1 which is a steering shaft connecting a steering wheel of a vehicle to an axle thereof.

The rotation angle sensing portion 2 of FIG. 1 further includes a microcomputer (hereinafter referred to as CPU) 9 for processing signals of the first sensing part 8 as shown in FIG. 2. The CPU 9 is connected to the torque sensing portion 3 via the serial communication line 4.

Described below is a case where a magnetic resistance element (MR element) is used as the first sensing part 8. The magnetic resistance element outputs a sine wave signal and a cosine wave signal in analog form when the direction of a magnetic field varies. When detecting changes in the direction of the magnetic field of the magnet 7 by the first sensing part 8, it is possible to obtain one-cycle sine wave signal and cosine wave signal outputs for a 180-degree rotation. Upon receiving these outputs, the CPU 9 can calculate rotation angle of the magnet 7, that is, rotation angle of the second rotatable body 6, by processing the entered outputs by means of an analog-to-digital (A/D) converter provided in the CPU 9. On the other hand, there is made an arrangement that enables the CPU 9 to take in high-accuracy, high-resolution rotation angle of 360 degrees or less detected by the torque sensing portion 3 which is fitted and locked onto the shaft portion 1 via the serial communication line 4.

Next, the torque sensing portion 3 is described with reference to FIG. 3.

Referring to FIG. 3, the torque sensing portion 3 includes a stator 13, a first resolver mechanism 14 and a second resolver mechanism 15. The first resolver mechanism 14 detects rotation angle of an input shaft 10 of the shaft portion 1 joined to the steering wheel while the second resolver mechanism 15 detects rotation angle of an output shaft 12 of the shaft portion 1 joined to the axle. The first resolver mechanism 14 includes a resolver output winding 16 disposed on the stator 13 and a resolver excitation winding 17 disposed on the input shaft 10, whereas the second resolver mechanism 15 includes a resolver output winding 18 disposed on the stator 13 and a resolver excitation winding 19 disposed on the output shaft 12. The input shaft 10 and the output shaft 12 are linked to each other by a torsion bar 11.

Next, the working of the torque sensing portion 3 is described with reference to FIGS. 4A and 4B.

Figure 4A:
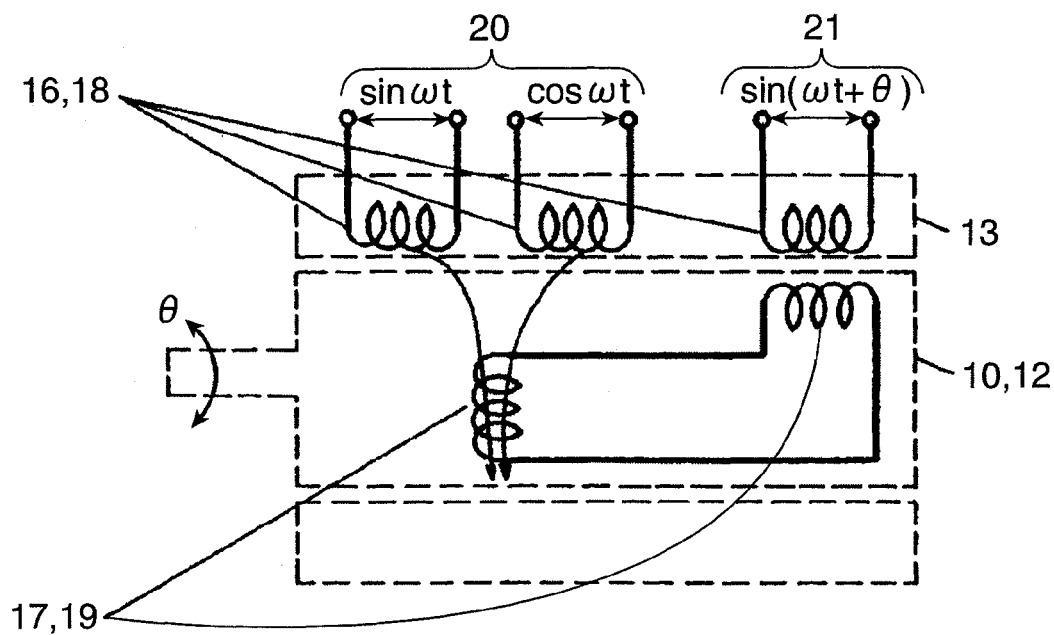
FIGS. 4A and 4B are diagrams showing an operating principle of the torque sensing portion 3 of FIGS. 1 and 2.
Figure 4B:
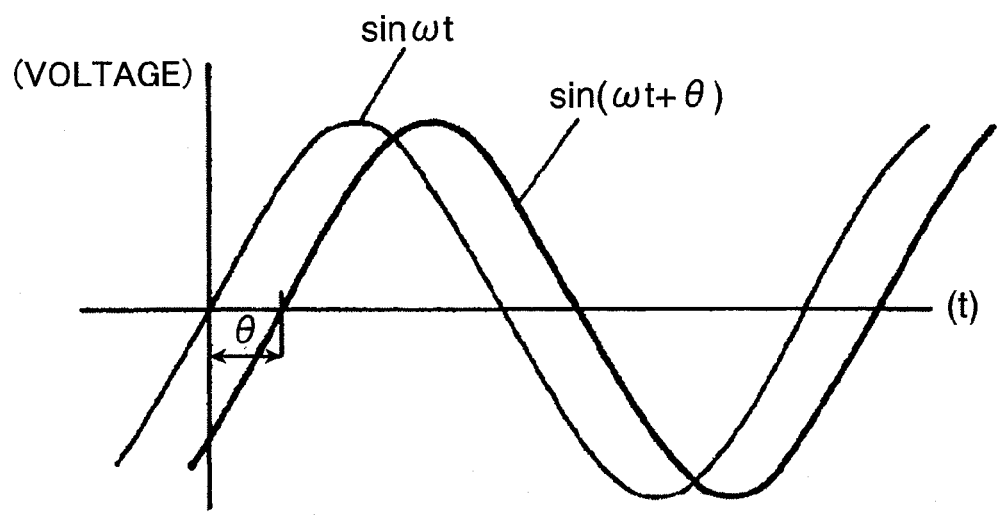

Referring to FIG. 4A, the resolver output windings 16 and 18 disposed on the stator 13 of FIG. 3 constitute an excitation winding 20 and a position output winding 21, respectively. Excitation voltages sin ωt and cos ωt output from the excitation winding 20 are delivered to the resolver excitation windings 17 and 19 disposed on rotors provided at the input shaft 10 and the output shaft 12. As these excitation voltages are superimposed, a voltage proportional to the rotation angle θ of the input shaft 10 or the output shaft 12 is fed back to the position output winding 21. In a signal diagram of FIG. 4B, a horizontal axis shows time t and a vertical axis shows excitation voltage and position output voltage, wherein sin ωt represents the excitation voltage output from the excitation winding 20 and sin(ωt+θ) represents the position output voltage fed back to the position output winding 21. A phase angle of the position output voltage relative to that of the excitation voltage gives the rotation angle of the input shaft 10 or the output shaft 12.

FIG. 5 shows individual detected waveforms representative of the rotation angle of the second rotatable body 6 built in the rotation angle sensing portion 2 and rotation angle of a resolver built in the torque sensing portion 3. In an upper part of FIG. 5, a horizontal axis shows the rotation angle of the shaft portion 1 and a vertical axis shows the rotation angle taken in from the torque sensing portion 3. The rotation angle taken in from the torque sensing portion 3 may be the rotation angle of the input shaft 10 detected by the torque sensing portion 3, for example.

On the other hand, in a lower part of FIG. 5, a horizontal axis shows the rotation angle of the shaft portion 1 and a vertical axis shows the rotation angle of the second rotatable body 6. The rotation angle of the second rotatable body 6 is what is calculated by the CPU 9 from the signals of the first sensing part 8. The first sensing part 8 (magnetic resistance element) detects changes in the direction of the magnetic field of the magnet 7 which is disposed at the central part of the second rotatable body 6 and outputs the one-cycle sine wave signal and cosine wave signal for one-half rotation of the magnet 7. It is possible to calculate the rotation angle of the second rotatable body 6 by processing these outputs by the CPU 9.

Next, a rotation angle sensing method of the rotation angle sensor according to the first embodiment of the present invention is described. Referring to FIGS. 1 and 2, when the shaft portion 1 rotates, the magnet 7 disposed at the center of the second rotatable body 6 rotates as a result of rotation of the wheel portion of the second rotatable body 6 joined to the worm portion of the first rotatable body 5 of the rotation angle sensing portion 2.

Provided that the number of teeth of the worm portion of the first rotatable body 5 is "a" and the number of teeth of the wheel portion of the second rotatable body 6 is "b", the second rotatable body 6 turns at a speed a/b times a rotating speed of the first rotatable body 5. As the numbers of teeth "a" and "b" of the individual gears of the first rotatable body 5 and the second rotatable body 6 are properly selected, the second rotatable body 6 rotates at a speed sufficiently lower than the rotating speed of the first rotatable body 5. The outputs of the first sensing part 8 located at a position opposed to the magnet 7 disposed at the central part of the second rotatable body 6 vary when changes in the direction of the magnetic field caused by rotation of the magnet 7 are detected. The CPU 9 takes in the outputs of the first sensing part 8 through the A/D converter. The second rotatable body 6 turns 180 degrees for a 720-degree rotation angle of the shaft portion 1. The rotation angle of the shaft portion 1 is calculated by the CPU 9 by processing the signals of the first sensing part 8.

On the other hand, the torque sensing portion 3 disposed coaxially with the shaft portion 1 determines angle of torsion of the torsion bar 11 from a difference between rotation angles of the first resolver mechanism 14 and the second resolver mechanism 15 as shown in FIGS. 3 and 4 and converts the angle of torsion into a torque value. The CPU 9 of the rotation angle sensing portion 2 takes in the rotation angle of the input shaft 10 of the shaft portion 1 which is joined to the steering wheel from the first resolver mechanism 14 through the serial communication line 4. FIG. 5 depicts behaviors of the rotation angle of the torque sensing portion 3 and the rotation angle of the second rotatable body 6 which vary with rotation of the shaft portion 1. FIG. 5 shows that the torque sensing portion 3 can detect the rotation angle of the shaft portion 1 with high accuracy and high resolution within a rotation angle sensing range of 45 degrees.

Now, specific processing steps of the rotation angle sensing method are described. A procedure for detecting absolute rotation angle of rotation angle A of the shaft portion 1 is described with reference to FIG. 5, for example. The rotation angle sensing portion 2 determines the rotation angle A measured from an initial position (0 degrees) of the shaft portion 1 from rotation angle C of the second rotatable body 6. Frequency of revolutions of the first resolver mechanism 14 from an initial position thereof is determined by dividing the rotation angle A by 45 degrees which is the rotation angle sensing range of the first resolver mechanism 14 of the torque sensing portion 3. FIG. 5 shows rotation angle B in a fourth rotating cycle. On the other hand, the rotation angle B of the torque sensing portion 3 at the rotation angle A of the shaft portion 1 is taken into the rotation angle sensing portion 2.

In this case, the absolute rotation angle of the rotation angle A of the shaft portion 1 is obtained by adding the rotation angle B of the torque sensing portion 3 to three cycles of the 45-degree rotation angle sensing range of the first resolver mechanism 14 of the torque sensing portion 3. Specifically, because "45 degrees×{(rotation angle A)/45 degrees}=45 degrees×3=135 degrees (where the value in { } is an integer)", it is possible to calculate the absolute rotation angle of the rotation angle A by "135 degrees+(rotation angle B)".

Second Embodiment

Figure 6:
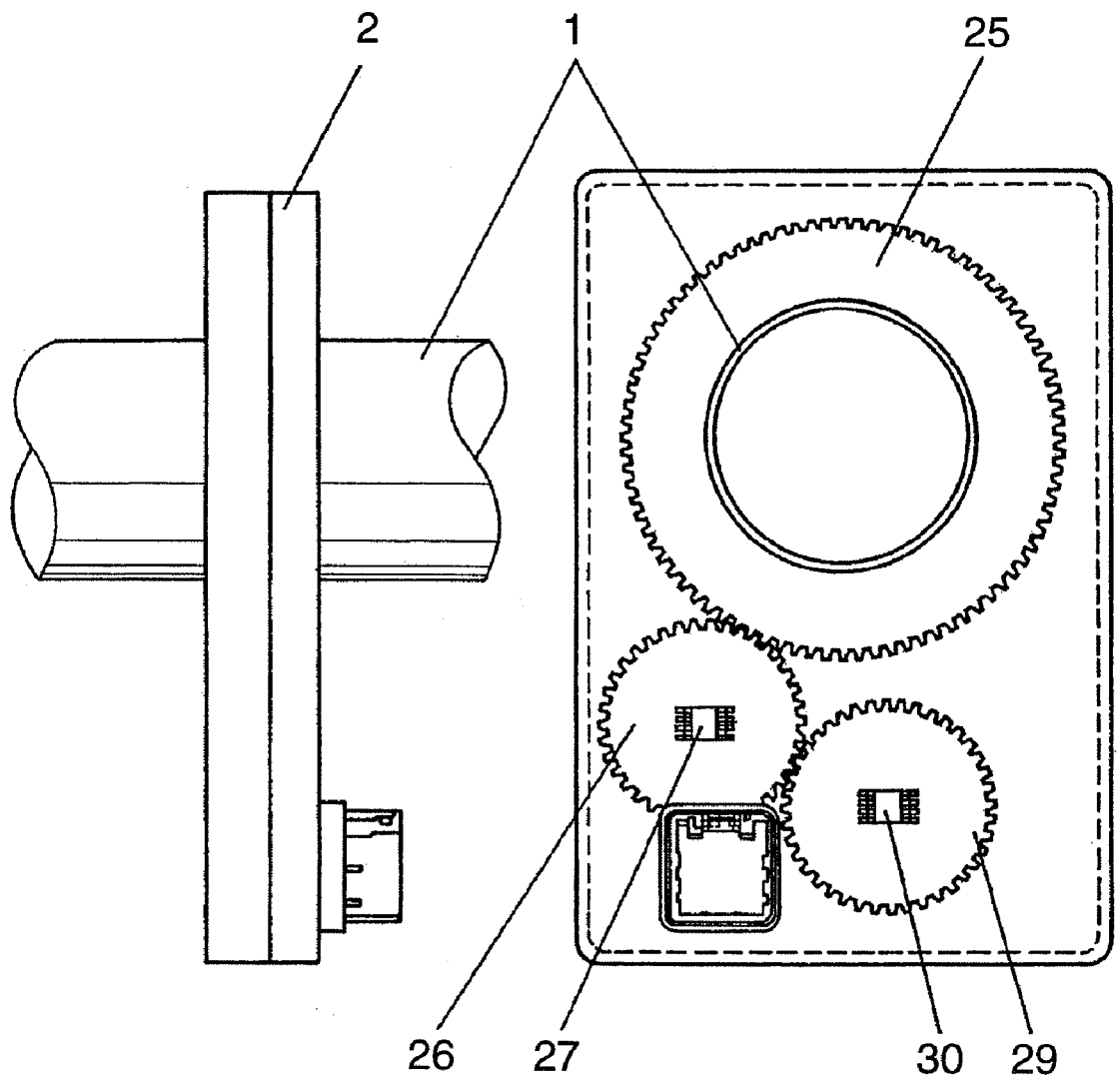
FIG. 6 is a diagram showing the basic configuration of a rotation angle sensor according to a second embodiment of the present invention.

A second embodiment of the present invention is now described with reference to FIGS. 6 to 8. FIG. 6 is a diagram showing the basic configuration of a rotation angle sensor according to the second embodiment of the present invention, FIG. 7 is a block diagram showing the circuit configuration of the rotation angle sensor of FIG. 6, and FIG. 8 is a diagram showing detected waveforms representative of absolute rotation angle of a shaft portion detected by the rotation angle sensor of FIG. 6.

Figure 7:
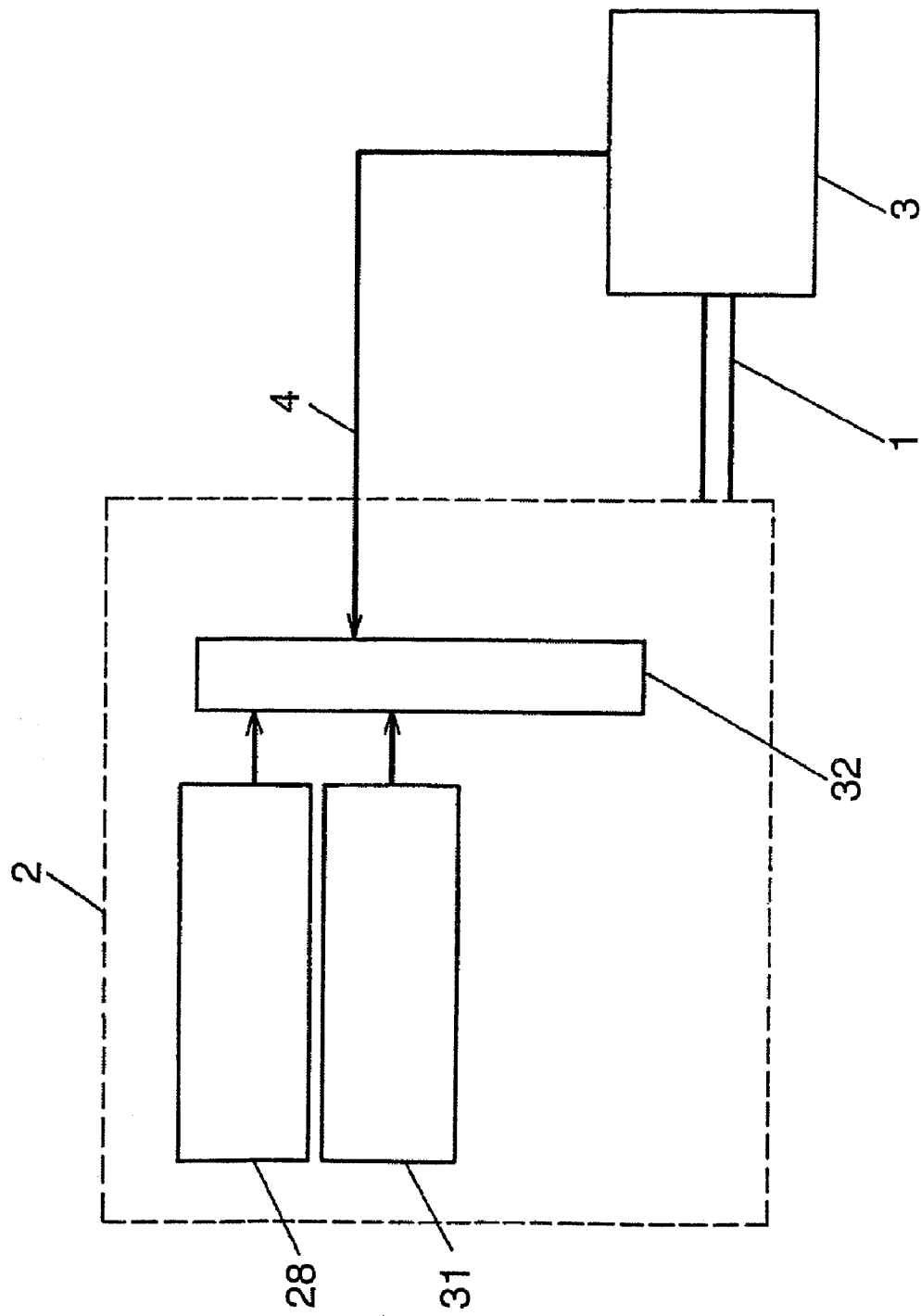
FIG. 7 is a block diagram showing the circuit configuration of the rotation angle sensor of FIG. 6.
Figure 8:
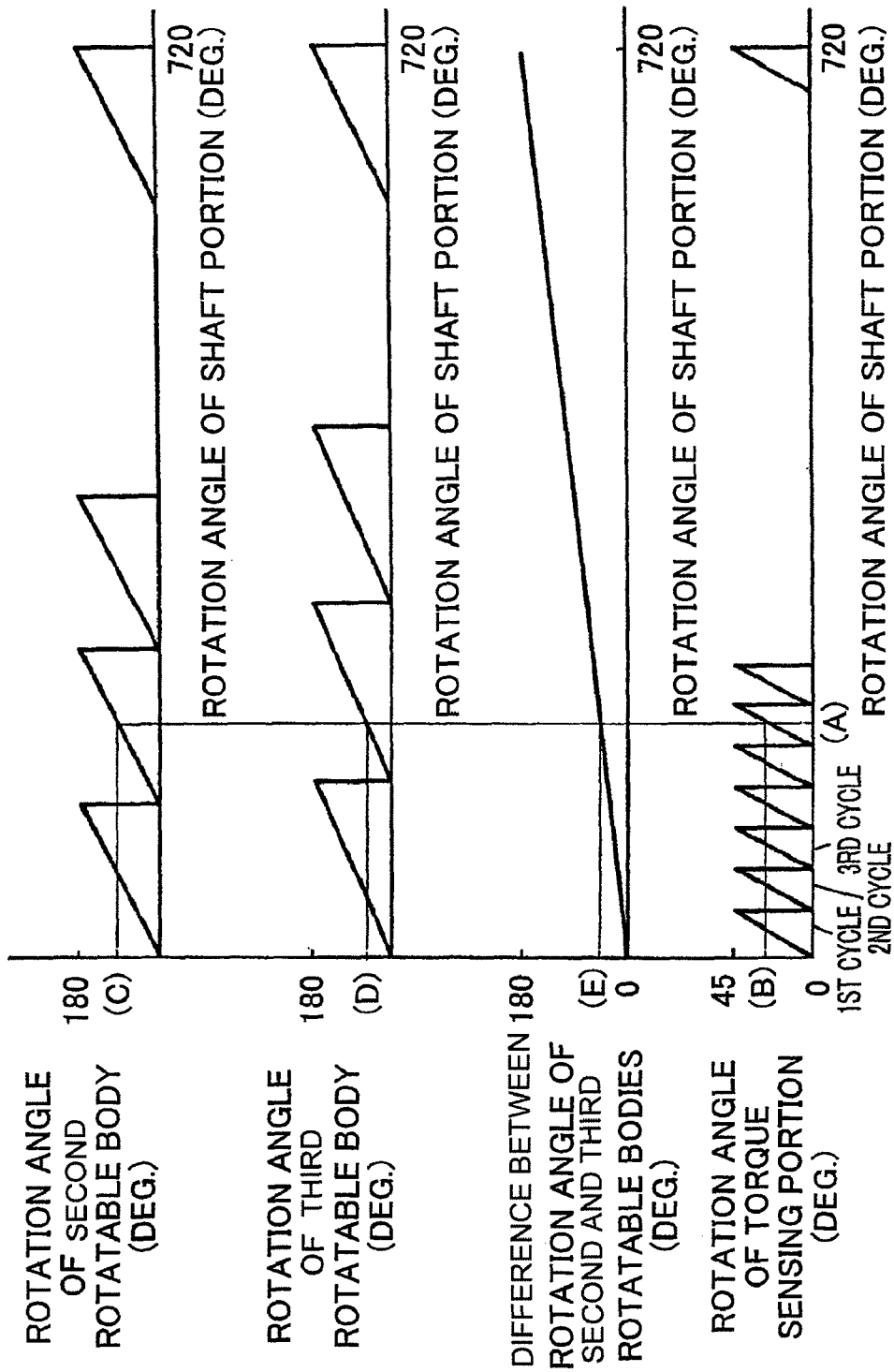
FIG. 8 is a diagram showing detected waveforms representative of absolute rotation angle of a shaft portion detected by the rotation angle sensor of FIG. 6.

Referring to FIGS. 6 and 7, the rotation angle sensor according to the second embodiment of the present invention comprises a rotation angle sensing portion 2 for detecting rotation angle of the shaft portion 1, such as a steering shaft, a torque sensing portion 3 and a serial communication line 4. The rotation angle sensing portion 2 includes a first rotatable body 25 made of a gear joined to the shaft portion 1, a second rotatable body 26 made of a gear joined to the gear of the first rotatable body 25, a magnet 27 disposed at a central part of the second rotatable body 26, a third rotatable body 29 made of a gear joined to the gear of the second rotatable body 26 and a magnet 30 disposed at a central part of the third rotatable body 29. The numbers of teeth of the second rotatable body 26 and the third rotatable body 29 are made different from each other.

The rotation angle sensing portion 2 of FIG. 6 further includes a first sensing part 28 located at a position opposed to the magnet 27 of the second rotatable body 26 for detecting rotation angle of the second rotatable body and a second sensing part 31 located at a position opposed to the magnet 30 of the third rotatable body 29 for detecting rotation angle of the third rotatable body 29. The first sensing part 28 and the second sensing part 31 are connected to a CPU (microcomputer) 32 as shown in FIG. 7.

As in the foregoing first embodiment, magnetic resistance elements are used in the first sensing part 28 and the second sensing part 31 and outputs thereof are processed by means of an A/D converter provided in the CPU 32 to calculate rotation angles of the magnet 27 and the magnet 30, that is, the rotation angles of the second rotatable body 26 and the third rotatable body 29. On the other hand, there is made an arrangement that enables the CPU 32 to take in high-accuracy, high-resolution rotation angle of 360 degrees or less detected by the torque sensing portion 3 which is fitted and locked onto the shaft portion 1 via the serial communication line 4. The torque sensing portion 3 of the present embodiment has the same configuration as the torque sensing portion 3 of the aforementioned first embodiment. FIG. 8 shows individual detected waveforms representative of the rotation angles of the second and third rotatable bodies 26, 29 built in the rotation angle sensing portion 2 and rotation angle of a resolver built in the torque sensing portion 3. In a first part of FIG. 8 from top, a horizontal axis shows the rotation angle of the shaft portion 1 and a vertical axis shows the rotation angle of the second rotatable body 26. This latter rotation angle is what is calculated by the CPU 32 from signals of the first sensing part 28. In a second part of FIG. 8 from top, a horizontal axis shows the rotation angle of the shaft portion 1 and a vertical axis shows the rotation angle of the third rotatable body 29. This latter rotation angle is what is calculated by the CPU 32 from signals of the second sensing part 31. In a third part of FIG. 8 from top, a horizontal axis shows the rotation angle of the shaft portion 1 and a vertical axis shows a difference between the rotation angles of the second rotatable body 26 and the third rotatable body 29. In a fourth part of FIG. 8 from top, a horizontal axis shows the rotation angle of the shaft portion 1 and a vertical axis shows the rotation angle taken in from the torque sensing portion 3. The rotation angle taken in from the torque sensing portion 3 is rotation angle of an input shaft 10. The first sensing part 28 (magnetic resistance element) detects changes in the direction of a magnetic field of the magnet 27 which is disposed at the central part of the second rotatable body 26 and outputs one-cycle sine wave and cosine wave signals for one-half rotation of the magnet 27. It is possible to calculate the rotation angle of the second rotatable body 26 by processing these outputs by the CPU 32. The second sensing part 31 detects changes in the direction of a magnetic field of the magnet 30 which is disposed at the central part of the third rotatable body 29 and outputs one-cycle sine wave and cosine wave signals for one-half rotation of the magnet 30. It is possible to calculate the rotation angle of the third rotatable body 29 by processing these outputs by the CPU 32. The torque sensing portion 3 uses the resolver as in the first embodiment. Next, a rotation angle sensing method of the rotation angle sensor according to the second embodiment of the present invention is described. Referring to FIGS. 6 to 8, when the shaft portion 1 rotates, the second rotatable body 26 is caused to rotate by rotation of the gear of the second rotatable body 26 joined to the gear of the first rotatable body 25 of the rotation angle sensing portion 2. At the same time, the third rotatable body 29 is caused to rotate by the gear of the third rotatable body 29 joined to the gear of the second rotatable body 26. Since the number of the teeth of the gear of the second rotatable body 26 and the number of the teeth of the gear of the third rotatable body 29 differ from each other, the second and third rotatable bodies 26, 29 rotate at different periods of revolution. The outputs of the first sensing part 28 located at the position opposed to the magnet 27 disposed at the central part of the second rotatable body 26 vary when the direction of the magnetic field of the magnet 27 of the rotating second rotatable body 26 is detected. The CPU 32 takes in the outputs of the first sensing part 28 through the A/D converter provided in the CPU 32. At the same time, the CPU 32 takes in the outputs of the second sensing part 31 for detecting the direction of the magnetic field of the magnet 30 disposed at the central part of the third rotatable body 29 through the A/D converter provided in the CPU 32. Since the torque sensing portion 3 uses the resolver as in the first embodiment, it is possible to detect the rotation angle of the shaft portion 1 with high accuracy and high resolution within a rotation angle sensing range of 45 degrees. The CPU 32 of the rotation angle sensing portion 2 takes in the rotation angle of the input shaft of the shaft portion 1 which is linked to the steering wheel via the serial communication line 4 from the first resolver mechanism 14. Now, specific processing steps of the rotation angle sensing method are described. A procedure for detecting absolute rotation angle of rotation angle A of the shaft portion 1 is described with reference to FIG. 8, for example. As shown in FIG. 8, the rotation angle sensing portion 2 takes in rotation angle B obtained from the torque sensing portion 3 when the rotation angle of the shaft portion 1 is "A". On the other hand, it is possible to determine the rotation angle A measured from an initial position (0 degrees) of the shaft portion 1 from the difference E between rotation angle C of the second rotatable body 26 and rotation angle D of the third rotatable body 29 when the rotation angle of the shaft portion 1 is "A". Frequency of revolutions of the first resolver mechanism 14 of the torque sensing portion 3 from an initial position thereof is determined by dividing the rotation angle A by 45 degrees which is a rotation angle sensing range of the first resolver mechanism 14. FIG. 8 shows the rotation angle B in a sixth rotating cycle. In this case, the absolute rotation angle of the rotation angle A of the shaft portion 1 is obtained by adding the rotation angle B of the torque sensing portion 3 to five cycles of the 45-degree rotation angle sensing range of the first resolver mechanism 14 of the torque sensing portion 3. Specifically, because "45 degrees×{(rotation angle A)/45 degrees}=45 degrees×5=225 degrees (where the value in { } is an integer)", it is possible to calculate the absolute rotation angle of the rotation angle A by "225 degrees+(rotation angle B)". According to the first and second embodiments of the present invention, it is possible to detect the rotation angle of the shaft portion by the rotation angle sensing portion. Especially because the angle of torsion of the torsion bar is made smaller than the rotation angle of the shaft portion and the rotation angle of the shaft portion is detected based on the angle of torsion of the torsion bar, it is possible to detect the rotation angle of the shaft portion with high accuracy and high resolution.

Third Embodiment

A third embodiment of the present invention is now described with reference to the drawings.

Figure 9:
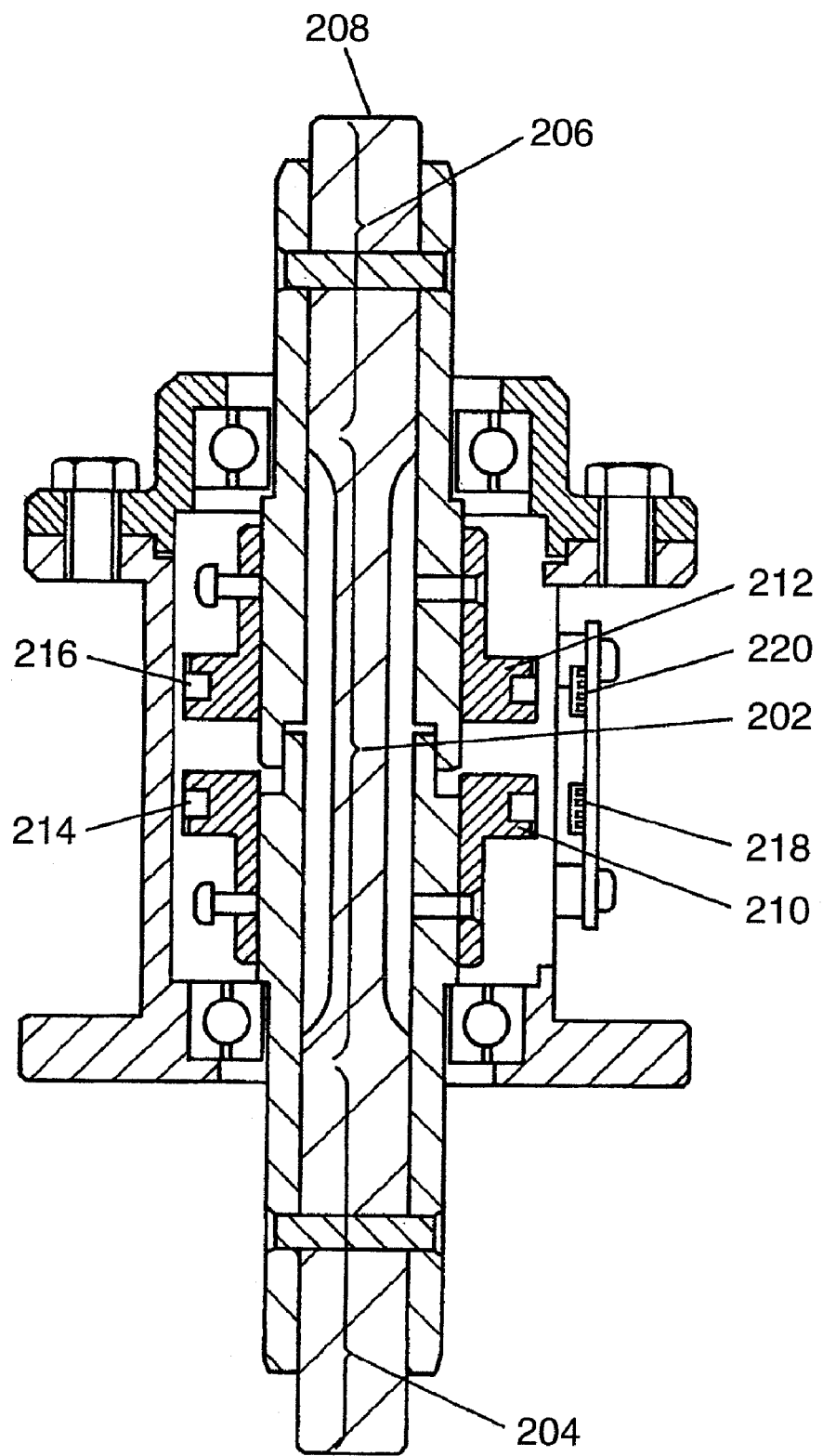
FIG. 9 is a cross-sectional view showing the configuration of a torque sensing portion provided in a rotation angle sensor according to a third embodiment of the present invention.
Figure 10:
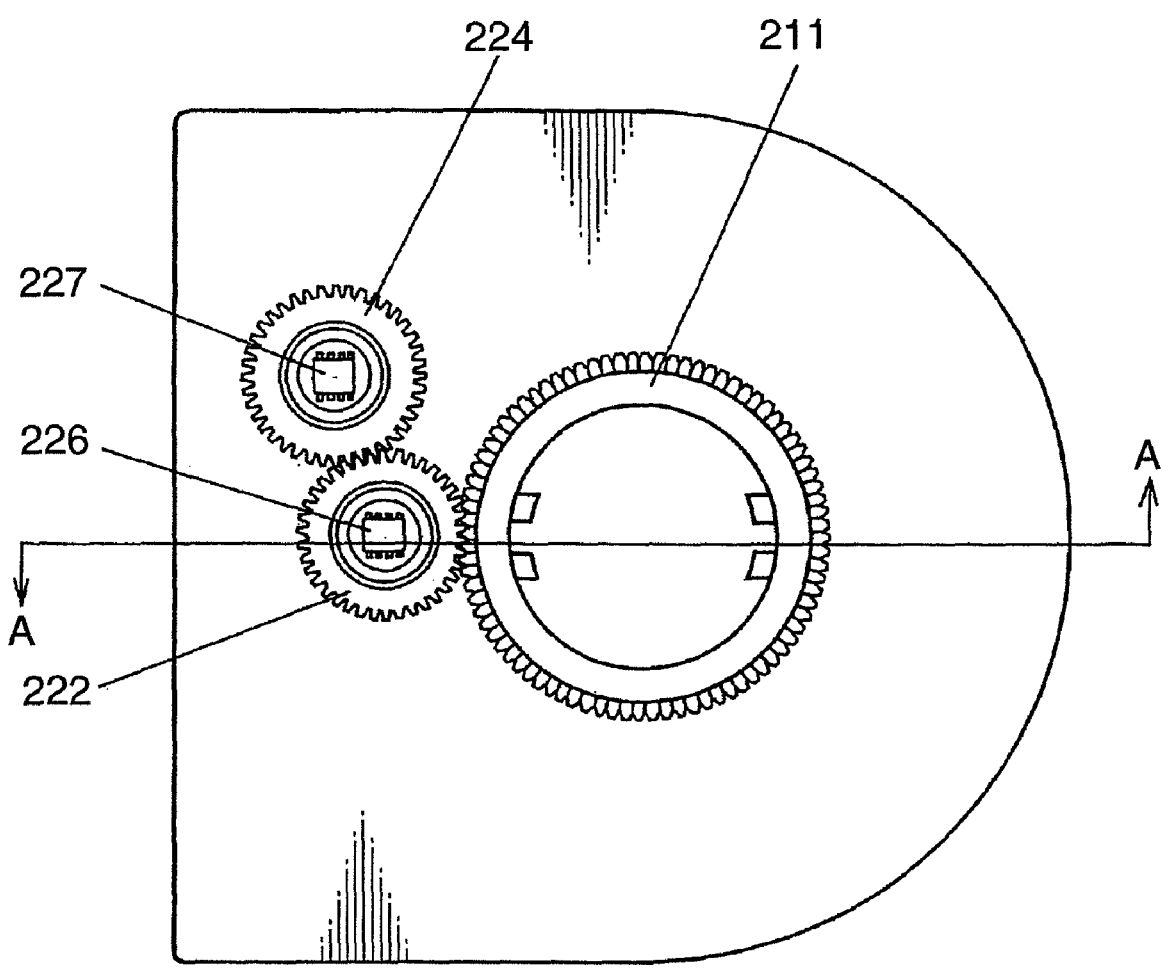
FIG. 10 is a top view showing the configuration of a rotation angle sensing portion provided in the rotation angle sensor according to the present embodiment.
Figure 11:
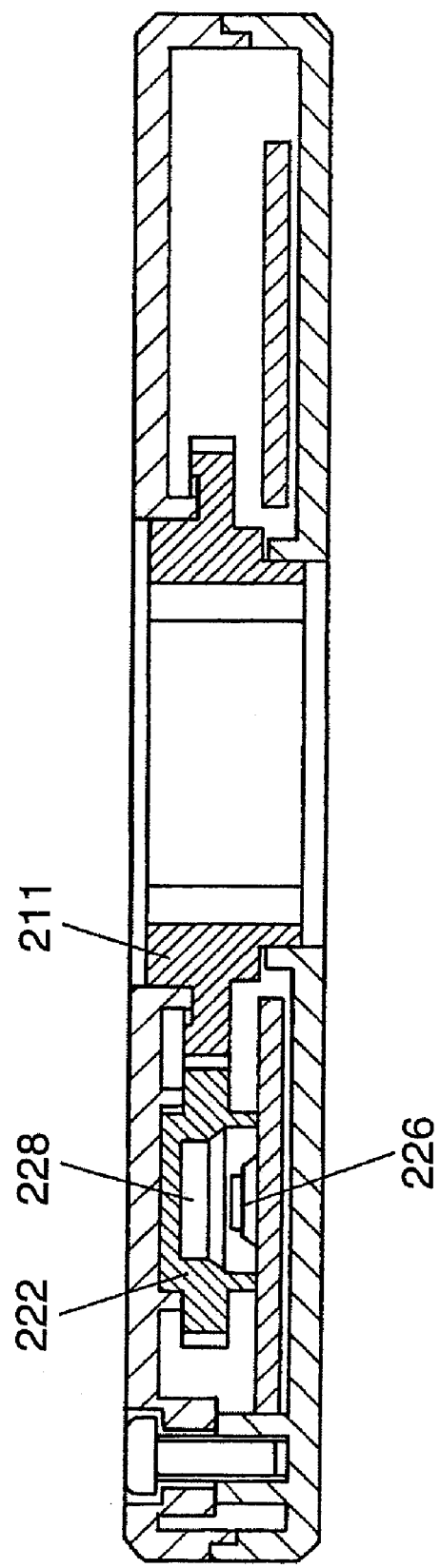
FIG. 11 is a cross-sectional view taken along lines A-A of FIG. 10.
Figure 12:
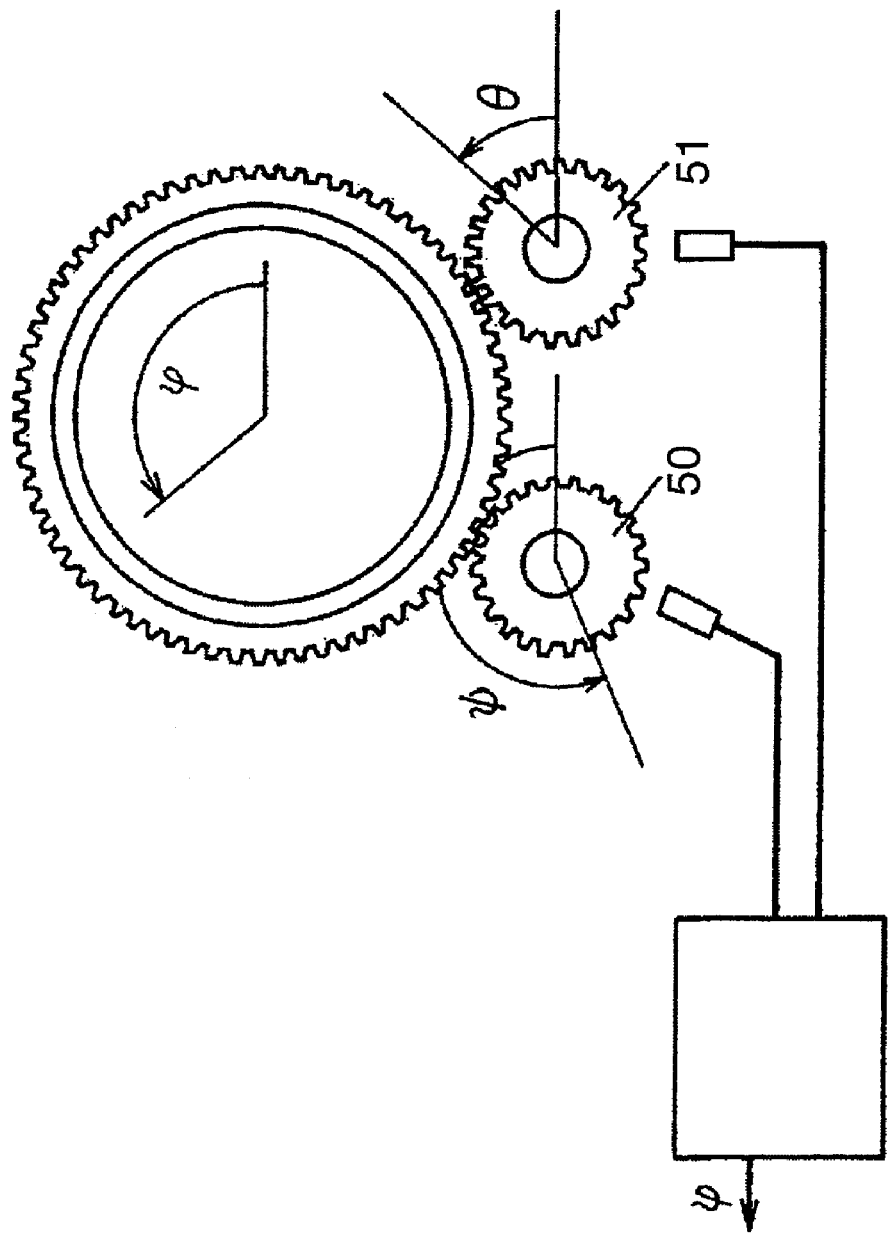
FIG. 12 is a diagram showing the configuration of a conventional rotation angle sensor.
Figure 13:
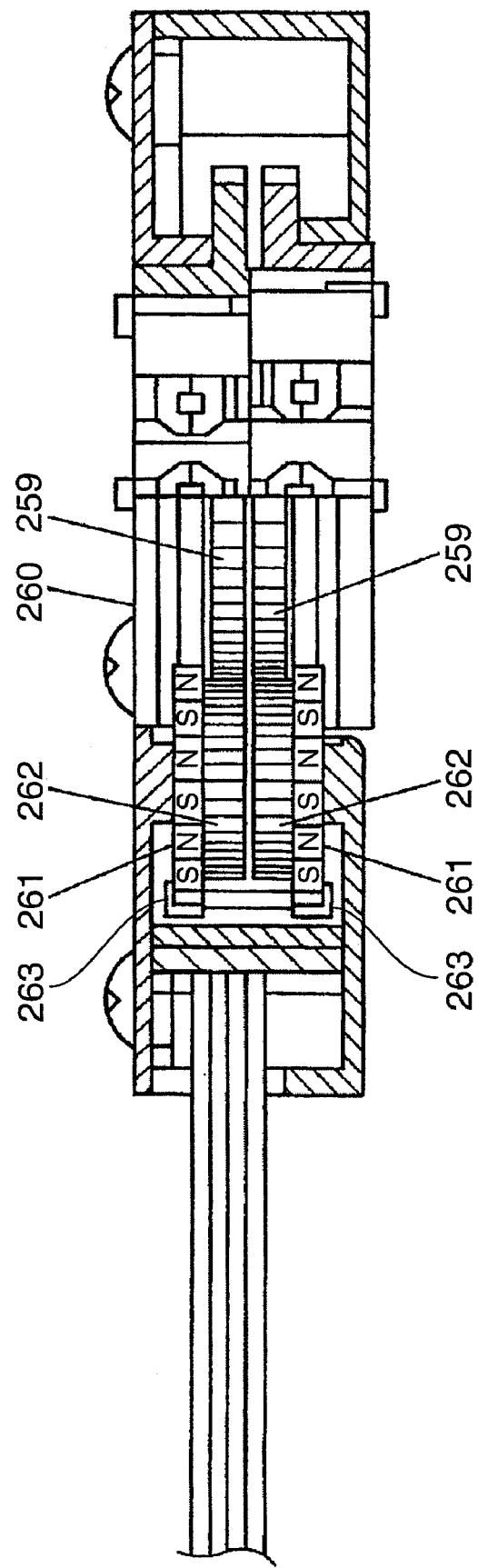
FIG. 13 is a diagram showing the configuration of another conventional rotation angle sensor.

FIG. 9 is a cross-sectional view showing the configuration of a torque sensing portion provided in a rotation angle sensor according to the third embodiment of the present invention, FIG. 10 is a top view showing the configuration of a rotation angle sensing portion provided in the rotation angle sensor according to the present embodiment, and FIG. 11 is a cross-sectional view taken along lines A-A of FIG. 10.

Referring to FIGS. 9 to 11, the rotation angle sensor according to the third embodiment of the present invention comprises a shaft portion 208 formed in a single rigid structure in which an input shaft 204 and an output shaft 206 are joined at both ends of a torsion bar 202, a torque sensing portion for detecting torque acting on the shaft portion 208 and the rotation angle sensing portion for detecting rotation angle of the shaft portion 208.

As shown in FIG. 9, the torque sensing portion of the rotation angle sensor according to the present embodiment includes a first rotatable body 210 and a second rotatable body 212 which are joined to the shaft portion 208 as if sandwiching the torsion bar 202, a first ring magnet portion 214 and a second ring magnet portion 216 which are held by the first and second rotatable bodies 210, 212 with magnetic poles having different polarities arranged alternately along circumferential directions of the first and second rotatable bodies 210, 212, and a first magnetism sensing device 218 and a second magnetism sensing device 220 which are disposed face to face with the magnetic poles of the first and second ring magnet portions 214, 216, respectively. The first magnetism sensing device 218 and the second magnetism sensing device 220 detect changes in magnetic fields. Provided that the number of the magnetic poles of each of the first ring magnet portion 214 and the second ring magnet portion 216 is X, an angle Y per pole is (360 degrees)/X. Also, it is assumed that a maximum value of a difference between rotation angles of the first rotatable body 210 and the second rotatable body 212 caused by the occurrence of torque is Z (Z<(Y/2)).

As shown in FIGS. 10 and 11, the rotation angle sensing portion of the rotation angle sensor according to the present embodiment includes a synchronizing rotatable body 211 which is joined to the shaft portion 208 and synchronizes with the first rotatable body 210 of the aforementioned torque sensing portion, a third rotatable body 222 and a fourth rotatable body 224 which synchronize with the synchronizing rotatable body 211, a third magnet portion 228 and a fourth magnet portion (not shown) which are held by the third and fourth rotatable bodies 222, 224 with magnetic poles having different polarities arranged alternately along circumferential directions of the third and fourth rotatable bodies 222, 224, and a third magnetism sensing device 226 and a fourth magnetism sensing device 227 which are disposed face to face with the magnetic poles of the third magnetism sensing device 226 and the fourth magnet portion, respectively. The third magnetism sensing device 226 and the fourth magnetism sensing device 227 detect changes in magnetic fields.

The synchronizing rotatable body 211 and the third and fourth rotatable bodies 222, 224 individually have gear structures and rotate in synchronism with one another with teeth of the third rotatable body 222 meshed with teeth of the synchronizing rotatable body 211 and teeth of the fourth rotatable body 224 meshed with the teeth of the third rotatable body 222. Gears of the third and fourth rotatable bodies 222, 224 have different numbers of teeth so that the ratio of the number of revolutions of the third rotatable body 222 to the number of revolutions of the synchronizing rotatable body 211 differs from the ratio of the number of revolutions of the fourth rotatable body 224 to the number of revolutions of the synchronizing rotatable body 211. Provided that the number of the teeth of the gear of the synchronizing rotatable body 211 is $\alpha$, the number of the teeth of the gear of the third rotatable body 222 is $\beta$ and the number of the teeth of the gear of the fourth rotatable body 224 is $\gamma$, the third rotatable body 222 turns at a speed $\alpha/\beta$ times a rotating speed of the synchronizing rotatable body 211 and the fourth rotatable body 224 turns at a speed $\alpha/\gamma$ times the rotating speed of the synchronizing rotatable body 211.

It is possible to determine rotation angle of the synchronizing rotatable body 211 over multiple revolutions thereof from a difference between rotation angles of the third rotatable body 222 and the fourth rotatable body 224 by properly selecting the numbers of the teeth $\alpha$, $\beta$, $\gamma$ of the gears.

Next, the working of the rotation angle sensing portion and the torque sensing portion of the rotation angle sensor of the present embodiment is described.

In the absence of torque, the input shaft 204, the torsion bar 202 and the output shaft 206 rotate as a single structure, so that when the input shaft 204 rotates, the second rotatable body 212 also rotates in synchronism with the input shaft 204. When the output shaft 206 rotates, the third and fourth rotatable bodies 222, 224 also rotate in synchronism while the first rotatable body 210 and the synchronizing rotatable body 211 rotate in synchronism with each other. It is possible to estimate which one of the X number of the magnetic poles of the first ring magnet portion 214 on the first rotatable body 210 is disposed face to face with the first magnetism sensing device 218 and determine which one of the Y-degree angular positions of the individual magnetic poles faces the first magnetism sensing device 218 with reference to the rotation angle of the synchronizing rotatable body 211.

When the torque occurs, the second rotatable body 212 deviates from the first rotatable body 210 in angular position by Z degrees at a maximum. In this case, it is supposed that one of the X number of the magnetic poles of the second ring magnet portion 216 located at the same position as the first rotatable body 210 faces the second magnetism sensing device 220 or, because Z<(Y/2), the magnetic pole adjacent to the magnetic pole located at the same position as the first rotatable body 210 faces the second magnetism sensing device 220. In addition, the second rotatable body 212 does not show the Y-degree angular position of the same magnetic pole of the second ring magnet portion 216 while the second rotatable body 212 deviates by Z degrees due to the occurrence of the torque. Therefore, it is possible to detect the Y-degree angular position of the magnetic pole of the second ring magnet portion 216 facing the second magnetism sensing device 220.

Further, the rotation angle sensing portion and the torque sensing portion are configured as a rotation angle sensor module and a torque sensor module, respectively, and the individual modules are separately mounted on the shaft portion 208. For example, the rotation angle sensor module is disposed at a steering column portion and the torque sensor module is disposed at a steering gearbox portion.

As specific means for correcting torque detected by the torque sensing portion, rotation angle data of the first rotatable body 210 and rotation angle data of the second rotatable body 212 corresponding to the synchronizing rotatable body 211 are prestored in a memory. This correcting means verifies which magnetic pole of the first ring magnet portion 214 of the first rotatable body 210 faces the first magnetism sensing device 218 and what angle is detected by the first rotatable body 210 from the rotation angle of the synchronizing rotatable body 211 and the rotation angle of the first rotatable body 210 and corrects the rotation angle of the first rotatable body 210 based on the rotation angle data prestored in the memory. This operation is similarly made for the second rotatable body 212.

As an example, it is assumed that the rotation angle of the first rotatable body 210 detected by the first magnetism sensing device 218 is "a" degrees, the rotation angle of the second rotatable body 212 detected by the second magnetism sensing device 220 is "b" degrees, and the rotation angle of the synchronizing rotatable body 211 detected by the third magnetism sensing device 226 and the fourth magnetism sensing device 227 is "c" degrees.

Since the synchronizing rotatable body 211 and the first rotatable body 210 rotate in synchronism with each other, it is possible to determine from the rotation angle "c" of the synchronizing rotatable body 211 that one of the X number of the magnetic poles on the first rotatable body 210 detected by the first magnetism sensing device 218 is a dth magnetic pole. Further, if the rotation angle of the synchronizing rotatable body 211 is "c" and angle correction data is "e" when the rotation angle of the first rotatable body 210 is "a", the rotation angle of the first rotatable body 210 becomes (a−e) degrees.

There is a case where an angular deviation of the second rotatable body 212 from the synchronizing rotatable body 211 occurs due to torque acting on the first rotatable body 210. Even in this case, the detected magnetic pole is the dth, (d−1)th or (d+1)th magnetic pole of the X number of the magnetic poles of the second ring magnet portion 216 because the amount of the angular deviation is smaller than the angular width (Y/2) of each magnetic pole. Therefore, the angle "b" of the second rotatable body 212 is uniquely determined for the angle "c" of the synchronizing rotatable body 211. If the rotation angle of the synchronizing rotatable body 211 is "c" and angle correction data is "f" when the rotation angle of the first rotatable body 210 is "b", the rotation angle of the second rotatable body 212 becomes (b−f) degrees. The torque sensing portion detects a torque of (a−e)−(b−f).

Accordingly, it is possible to improve torque detecting accuracy because the rotation angles of the first and second rotatable bodies are corrected based on the rotation angle of the synchronizing rotatable body of the rotation angle sensing portion even when the rotation angle of the first rotatable body and the rotation angle of the second rotatable body of the torque sensing portion differ from true rotation angles due to variations in size of the magnetic poles, for instance.

According to the third embodiment of the present invention, it is possible to improve the torque detecting accuracy as the rotation angle sensing portion and the torque sensing portion operate in a cooperative fashion. In particular, even when the module of the rotation angle sensing portion is disposed at the steering column portion and the module of the torque sensing portion is disposed at the steering gearbox portion, the rotation angle sensing portion and the torque sensing portion can improve the detecting accuracy, working cooperatively with each other.

From the individual embodiments thus far described, the present invention is summarized as mentioned hereunder. Specifically, a rotation angle sensor of the invention comprises a shaft portion having a torsion bar, a rotation angle sensing portion for detecting rotation angle of the shaft portion, and a torque sensing portion for detecting angle of torsion of the torsion bar, wherein the rotation angle sensing portion and the torque sensing portion improve their own detecting accuracies by using each other's detecting result.

In the aforementioned rotation angle sensor, the rotation angle sensor uses the detecting result of the torque sensing portion when detecting the rotation angle of the shaft portion. On the other hand, the torque sensing portion uses the detecting result of the rotation angle sensing portion when detecting the torque acting on the shaft portion. Accordingly, it is possible to detect the rotation angle and torque of the shaft portion with higher accuracy and higher resolution as compared to a conventional arrangement in which the rotation angle and torque are separately detected.

In the aforementioned rotation angle sensor, the rotation angle sensing portion preferably detects the rotation angle of the shaft portion based on rotation angle of an input side or an output side of the torsion bar which is used by the torque sensing portion when detecting the angle of torsion of the torsion bar.

In this case, it is possible to detect the rotation angle of the shaft portion with higher accuracy and higher resolution compared to a case where the rotation angle of the shaft portion is calculated only from the rotation angle detected by the rotation angle sensing portion.

In the aforementioned rotation angle sensor, the rotation angle sensing portion preferably includes a first rotatable body which is joined to the shaft portion and rotates in synchronism with rotation of the shaft portion, a second rotatable body which rotates in synchronism with rotation of the first rotatable body, and a first sensing part for detecting rotation angle of the second rotatable body, wherein the second rotatable body rotates at a lower speed than the first rotatable body.

In this case, it is possible to detect the rotation angle of the shaft portion over multiple revolutions thereof because the rotation angle of the shaft portion is detected from the rotation angle of the second rotatable body which rotates in synchronism with but at a lower speed than the first rotatable body.

In the aforementioned rotation angle sensor, the rotation angle sensing portion may preferably include a first rotatable body which is joined to the shaft portion and rotates in synchronism with rotation of the shaft portion, a second rotatable body which rotates in synchronism with the first rotatable body, a third rotatable body which rotates in synchronism with the second rotatable body, and first and second sensing parts for detecting rotation angles of the second and third rotatable bodies, wherein the ratio of the number of revolutions of the second rotatable body to the number of revolutions of the first rotatable body and the ratio of the number of revolutions of the third rotatable body to the number of revolutions of the first rotatable body differ from each other.

In this case, it is possible to detect the rotation angle of the shaft portion over multiple revolutions thereof because the rotation angle of the shaft portion is detected from a difference between the rotation angles of the second and third rotatable bodies which rotate at the different ratios of the number of revolutions to the number of revolutions of the first rotatable body which rotates in synchronism with the shaft portion.

In the aforementioned rotation angle sensor, the torque sensing portion preferably includes first and second resolver mechanisms each having a resolver excitation winding joined to the torsion bar and a resolver output winding which outputs a signal corresponding to rotation angle of the torsion bar produced by excitation by the resolver excitation winding as a result of rotation of the torsion bar, wherein the first resolver mechanism is disposed at the input side of the torsion bar and the second resolver mechanism is disposed at the output side of the torsion bar.

In this case, it is possible to detect the rotation angles of the input side and the output side of the torsion bar with high accuracy without the influence of a magnetic field or an electric field.

In the aforementioned rotation angle sensor, the torque sensing portion preferably includes first and second rotatable bodies which are joined respectively to the input side and the output side of the torsion bar in such a manner that each of the first and second rotatable bodies sandwiches the torsion bar, whereby the torque sensing portion detects the angle of torsion of the torsion bar based on a difference between rotation angles of the first and second rotatable bodies, and the rotation angle sensing portion preferably includes a synchronizing rotatable body which is joined to the shaft portion and rotates in synchronism with rotation of the first rotatable body, whereby the rotation angle sensing portion detects the rotation angle of the shaft portion based on rotation angle of the synchronizing rotatable body, wherein the rotation angles of the first and second rotatable bodies are corrected based on the rotation angle of the synchronizing rotatable body.

In this case, it is possible to improve detecting accuracy of the rotation angles of the first and second rotatable bodies because when the torque sensing portion detects the rotation angles of the input side and the output side of the torsion bar, the rotation angles of the first and second rotatable bodies used for detection of the rotation angles of individual shafts of the torsion bar are corrected based on the rotation angle of the synchronizing rotatable body of the rotation angle sensing portion for detecting the rotation angle of the shaft portion.

In the aforementioned rotation angle sensor, the rotation angles of the first and second rotatable bodies are preferably corrected based on prestored data on correcting angles by which the rotation angles of the first and second rotatable bodies are to be corrected with reference to the rotation angle of the synchronizing rotatable body.

In this case, it is possible to efficiently correct the rotation angles of the first and second rotatable bodies because data necessary for correcting the rotation angles of the first and second rotatable bodies are collected and stored in advance and can be used when making corrections.

In the aforementioned rotation angle sensor, the rotation angle sensing portion and the torque sensing portion are preferably configured as modules separately mounted on the shaft portion, wherein the module of the rotation angle sensing portion is disposed at a steering column portion and the module of the torque sensing portion is disposed at a steering gearbox portion.

In this case, it is possible to enhance detecting accuracy of the rotation angle and torque of the shaft portion by the rotation angle sensing portion disposed at the steering column portion and the torque sensing portion disposed at the steering gearbox portion.

INDUSTRIAL APPLICABILITY

A rotation angle sensor according to the present invention can be mounted on a steering shaft, for instance. The rotation angle sensor with a simple configuration can detect absolute rotation angle of a multi-turn steering wheel with high accuracy and high resolution and can be used in power steering systems of various kinds of vehicles, for instance.

The rotation angle sensor of the present invention, in which a rotation angle sensing portion and a torque sensing portion work cooperatively with each other, can provide improved detecting accuracy and can be used in power steering systems of various kinds of vehicles, for instance.

The invention claimed is:

1. A rotation angle sensor comprising:
a shaft portion having a torsion bar;
a rotation angle sensing portion for detecting rotation angle of the shaft portion; and
a torque sensing portion for detecting angle of torsion of the torsion bar;
wherein:
the rotation angle sensing portion improves its own detecting accuracy by using results of detection by the torque sensing portion;
the rotation angle sensing portion detects the rotation angle of the shaft portion based on rotation angle of an input side or an output side of the torsion bar which is used by the torque sensing portion when detecting the angle of torsion of the torsion bar;
the rotation angle sensing portion includes:
a first rotatable body which is joined to the shaft portion and which rotates in synchronism with rotation of the shaft portion;
a second rotatable body which is not joined to the shaft portion and which rotates in synchronism with rotation of the first rotatable body; and
a first sensing part for detecting rotation angle of the second rotatable body; and
the second rotatable body rotates at a lower speed than the first rotatable body.

2. A rotation angle sensor comprising:
a shaft portion having a torsion bar;
a rotation angle sensing portion for detecting rotation angle of the shaft portion; and
a torque sensing portion for detecting angle of torsion of the torsion bar;
wherein:
the rotation angle sensing portion improves its own detecting accuracy by using results of detection by the torque sensing portion;
the rotation angle sensing portion detects the rotation angle of the shaft portion based on rotation angle of an input side or an output side of the torsion bar which is used by the torque sensing portion when detecting the angle of torsion of the torsion bar;
the rotation angle sensing portion includes:
a first rotatable body which is joined to the shaft portion and rotates in synchronism with rotation of the shaft portion;
a second rotatable body which rotates in synchronism with rotation of the first rotatable body;
a third rotatable body which rotates in synchronism with rotation of the second rotatable body; and
first and second sensing parts for detecting rotation angles of the second and third rotatable bodies; and
the ratio of the number of revolutions of the second rotatable body to the number of revolutions of the first rotatable body and the ratio of the number of revolutions of the third rotatable body to the number of revolutions of the first rotatable body differ from each other.

3. A rotation angle sensor comprising:
a shaft portion having a torsion bar;
a rotation angle sensing portion for detecting rotation angle of the shaft portion; and
a torque sensing portion for detecting angle of torsion of the torsion bar;
wherein:
the rotation angle sensing portion improves its own detecting accuracy by using results of detection by the torque sensing portion;
the rotation angle sensing portion detects the rotation angle of the shaft portion based on rotation angle of an input side or an output side of the torsion bar which is used by the torque sensing portion when detecting the angle of torsion of the torsion bar;
the torque sensing portion includes first and second resolver mechanisms each having a resolver excitation winding joined to the torsion bar and a resolver output winding which outputs a signal corresponding to rotation angle of the torsion bar produced by excitation by the resolver excitation winding as a result of rotation of the torsion bar, and
the first resolver mechanism is disposed at the input side of the torsion bar and the second resolver mechanism is disposed at the output side of the torsion bar.

4. The rotation angle sensor as recited in claim 1, wherein the torque sensing portion includes third and fourth rotatable bodies which are joined respectively to the input side and the output side of the torsion bar in such a manner that each of the third and fourth rotatable bodies sandwiches the torsion bar, whereby the torque sensing portion detects the angle of torsion of the torsion bar based on a difference between rotation angles of the third and fourth rotatable bodies,
the rotation angle sensing portion includes a synchronizing rotatable body which is joined to the shaft portion and rotates in synchronism with rotation of the third rotatable body, whereby the rotation angle sensing portion detects the rotation angle of the shaft portion based on rotation angle of the synchronizing rotatable body, and
the rotation angles of the third and fourth rotatable bodies are corrected based on the rotation angle of the synchronizing rotatable body.

5. The rotation angle sensor as recited in claim 4, wherein the rotation angles of the third and fourth rotatable bodies are corrected based on prestored data on correcting angles by which the rotation angles of the third and fourth rotatable bodies are to be corrected with reference to the rotation angle of the synchronizing rotatable body.

6. The rotation angle sensor as recited in claim 1, wherein the rotation angle sensing portion and the torque sensing portion are configured as modules separately mounted on the shaft portion, and
the module of the rotation angle sensing portion is disposed at a steering column portion and the module of the torque sensing portion is disposed at a steering gearbox portion.

* * * * *